C. J. McPHERSON.
FURNACE.
APPLICATION FILED APR. 18, 1916.

1,218,288.

Patented Mar. 6, 1917.

Witnesses:

Inventor.

By

Atty.

UNITED STATES PATENT OFFICE.

CHARLES J. McPHERSON, OF PORTLAND, OREGON.

FURNACE.

1,218,288.  Specification of Letters Patent.  Patented Mar. 6, 1917.

Application filed April 18, 1916. Serial No. 91,901.

*To all whom it may concern:*

Be it known that I, CHARLES J. MCPHERSON, a citizen of the United States, residing in the city of Portland, county of Multnomah, and State of Oregon, have invented certain new and useful Improvements in Furnaces, of which the following is a specification.

My invention relates to furnaces, and more particularly to a hot air furnace, and it has among its salient objects to provide improvements therein which will increase the efficiency of the furnace by distributing the air entering the furnace inclosure, and causing a better contact thereof with the heating surfaces of the furnace as it passes upwardly therethrough. I accomplish this by a series of deflectors, or baffle plates, and by changing the form of some of the heating pipes with which the air comes in contact so as to get a more continuous contact.

In order that others may understand my invention, I have illustrated a practical embodiment thereof in the accompanying sheet of drawings which I will now describe.

Figure 1:
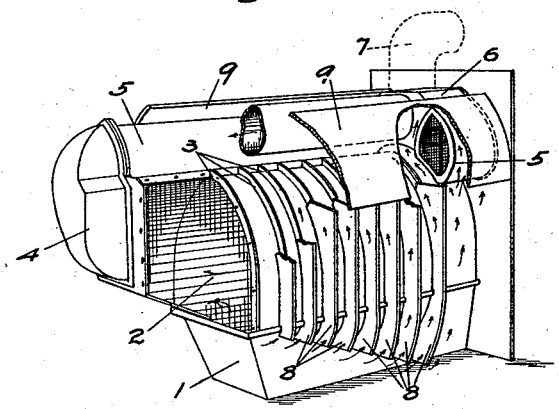
Figure 2:
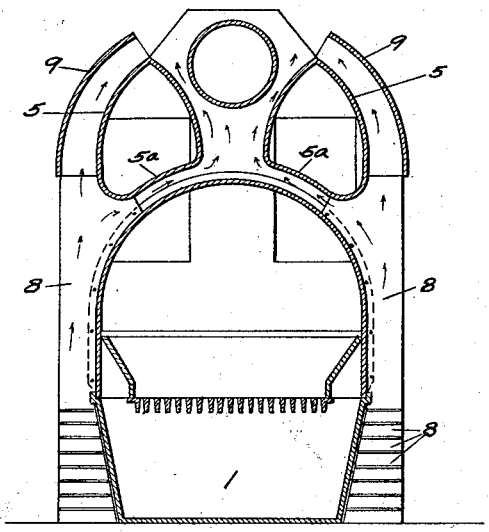
Figure 2:

Figure 1 is a perspective view, with parts broken away, showing the main features of a hot air furnace with my invention applied thereto; and Fig. 2 is a vertical sectional view thereof.

Referring now more in detail to the drawings, 1 designates the ash box, 2 the combustion chamber having the curved side walls with the ribs 3—3. Connected with the rear end of the combustion chamber 2, by means of connecting end members 4, are smoke and heat pipes 5—5, extending forwardly over the top of the combustion chamber and connected with a chamber member 6, with the top of which may be connected a smoke stack, as 7, indicated in dotted lines. Secured to the rib members 3—3, at opposite sides of the combustion chamber are deflector members 8—8, of successively different lengths, as clearly indicated in Fig. 1, whereby air entering the rear of the housing for the furnace (not shown), will be distributed so that some of it passes upwardly in front of each of the deflector members 8—8. Mounted over the pipes 5—5, at a space therefrom, are two pipe deflectors 9—9, extending lengthwise of the furnace.

Attention is called to the fact that the pipes 5—5, are formed oval-shape along their upper sides, whereby the air, passing upwardly around the same, is kept in contact therewith by means of the pipe deflectors 9—9, which is a real improvement over a round pipe, for the reason that on top of a round pipe there is a considerable surface for the full length of the pipe which serves for the accumulation of dust thereupon, thus proving that the air does not come in contact therewith. Therefore, I have changed the form of this pipe along its top surface and have provided the pipe deflectors 9—9, to insure the contact of the air with the pipe surface. I have also formed the bottom sides of said pipes 5—5, somewhat concaved to conform with the curved form of the top wall of the combustion chamber, as at 5—5ª, thus making provision for the portion of the air passing upwardly between the deflectors 8—8, to be deflected upwardly between the combustion chamber housing, and the pipes 5—5.

Thus by means of the graduated deflectors 8—8, and the form of the pipes 5—5, and the pipe deflectors 9—9, I am able to increase the heating efficiency of the furnace, because of a better distribution of the air and its better contact with the heating surfaces.

I do not limit my invention to the exact details here shown, except as I may be limited by the hereto appended claims forming a part hereof.

I claim:

1. In a hot air furnace, in combination with the combustion chamber housing, smoke and heat pipes communicating with said combustion chamber and extending along the outside of said combustion chamber housing, and spaced therefrom, pipe deflectors adjacent said pipes for causing the air to contact with said pipes in its upward course, said pipes having their top sides tapering upwardly to an angle, whereby to increase the air contact therewith.

2. In a hot air furnace, in combination with a combustion chamber and the housing therefor, one or more pipes communicating with said combustion chamber and extended along the outside of said combustion chamber housing, said pipes having their sides next adjacent said housing conforming to the form of said housing and spaced therefrom, whereby to provide an air passageway between said housing and said pipes and having their top sides tapering to an angle in cross section, and pipe deflectors extended along the outside of said pipes at a space therefrom, substantially as and for the purpose described.

3. In a hot air furnace, in combination, a fire box, smoke and heat pipes communicating therewith and extended along the outside of said fire box, said pipes having their top sides formed into an upwardly pointing angle in cross section, and pipe deflectors extended along the outside and above said pipes at a space therefrom, whereby to increase air contact with said pipes, substantially as described.

4. In a hot air furnace, in combination, a fire box, smoke and heat pipes communicating therewith and extending along the outside of said fire box at a space therefrom, said pipes having their under surfaces formed in parallelism with the upper surface of said fire box, said pipes also having their upper surfaces forming an upwardly directed angle extending longitudinally thereof, whereby to avoid any flat, top surface, and spaced deflectors adjacent said pipes in substantial parallelism with their upper surfaces, substantially as and for the purpose described.

Signed at Portland, Multnomah county, Oregon, this 12th day of April, 1916.

CHARLES J. McPHERSON.

In presence of—
I. M. GRIFFIN,
J. C. STRENG.

Copies of this patent may be obtained for five cents each, by addressing the "Commissioner of Patents, Washington, D. C."